Nov. 29, 1949 J. ROBINSON 2,489,435
POWER TRANSMISSION
Filed March 22, 1948 2 Sheets-Sheet 1

INVENTOR.
JAMES ROBINSON
BY Ralph L. Tweedale
ATTORNEY

INVENTOR.
JAMES ROBINSON
BY Ralph L. Tweedale
ATTORNEY

Patented Nov. 29, 1949

2,489,435

UNITED STATES PATENT OFFICE 2,489,435

POWER TRANSMISSION

James Robinson, Huntington Woods, Mich., assignor to Vickers Incorporated, Detroit, Mich., a corporation of Michigan Application March 22, 1948, Serial No. 16,180

10 Claims. (Cl. 60—97)

This invention relates to power transmissions, particularly to those of the type comprising two or more fluid pressure energy translating devices, one of which may function as a pump and another as a fluid motor.

The invention is more particularly concerned with a control valve system for controlling the operation of one or more fluid motors at will and for automatically unloading the pump when all motors are cut out of operation. Prior valve control systems which embody automatic pump unloading have heretofore been of two types. One, exemplified by the patent to Berglund No. 2,289,567 issued July 14, 1942, utilizes a pump unloading passage formed as a part of and controlled by each motor selector valve. The other type, exemplified by the patents to De Millar No. 2,057,086 issued October 13, 1936, and Huguenin No. 1,829,655 issued October 27, 1931, utilizes a separate unloading valve, the operation of which is controlled by means of pilot control exerted by the motor selector valves.

While either of these prior systems is adequate for particular fields of use, each has some disadvantages in other fields and is thus not widely adaptable to all purposes. Thus, with the first mentioned type of control, the selector valves have to be large in order to handle the full pump volume through the unloading passage. Also it is difficult to arrange the port overlaps between the unloading valve part and the selector valve part in a completely satisfactory way. On the other hand, control systems of the second type have been difficult to operate with smooth control due to sudden closing of the unloading valve and sometimes introduce unreliability in operation. Heretofore, systems of either type have also been limited in their application due to the inability of such a system to provide gradual metering characteristics in starting a fluid motor by slowly moving its selector valve toward operating position.

Various attempts have been made to provide good metering characteristics, but heretofore they have only been had at the sacrifice of either unduly great travel of the movable valve member and consequent increase in the overall size of the valve, or at the sacrifice of safety due to the possibility of dropping the motor load, or at the sacrifice of having to build up pump pressure to relief valve setting before starting motor operation and consequently risking the possibility of stalling the engine which drives the pump.

It is an object of the present invention to provide an improved control valve system of this general class which provides all of the advantages of each of the prior art types while avoiding their disadvantages. More specifically, it is an object of the present invention to provide such a system wherein a pilot operated unloading valve may be controlled from one or more motor selector valves with full metering control.

It is a further object to provide such a valve system wherein the unloading valve may be gradually operated to any desired position by operation of a motor selector valve and to effect such control by operator movements which are naturally undertaken when attempting to gradually start operation of the motor.

Another object is to provide a control valve system of the character described in which a graduated control of pressure build-up may be obtained solely by operation of a motor selector valve.

It is also an object to provide such a system which will be safe against the possibility of dropping the load when starting a motor in operation, one which does not build up back pressure on the pump higher than required to operate a given motor, and one which is of compact, economical and reliable construction throughout.

Further objects and advantages of the present invention will be apparent from the following description, reference being had to the accompanying drawings wherein a preferred form of the present invention is clearly shown.

Figure 1:
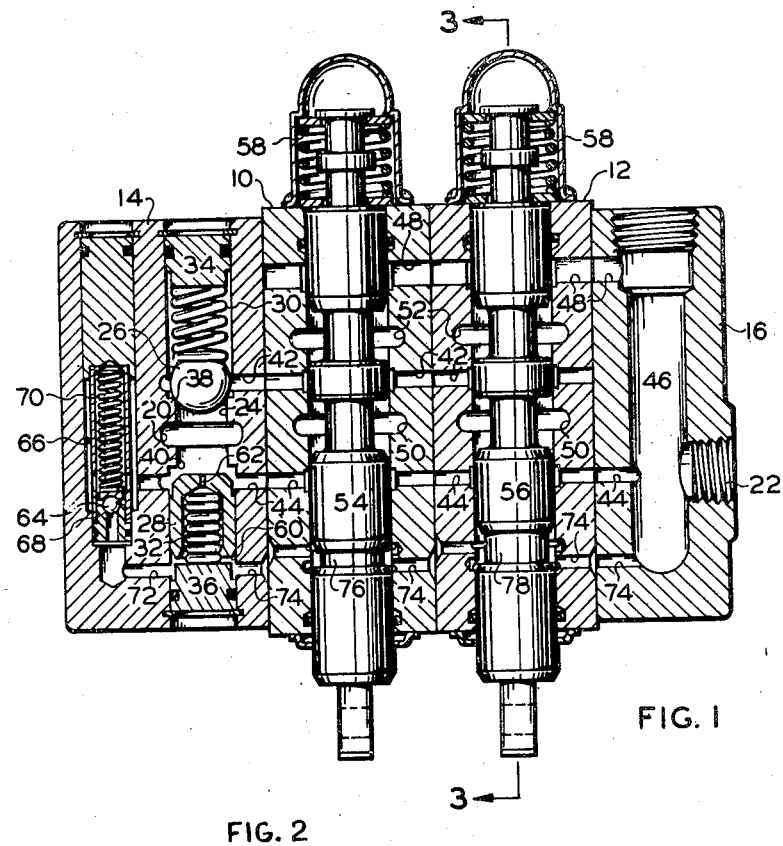
Figure 1 is a sectional view on line 1—1 of Figure 2 illustrating a multiple valve bank embodying a preferred form of the present invention.
Figure 2:
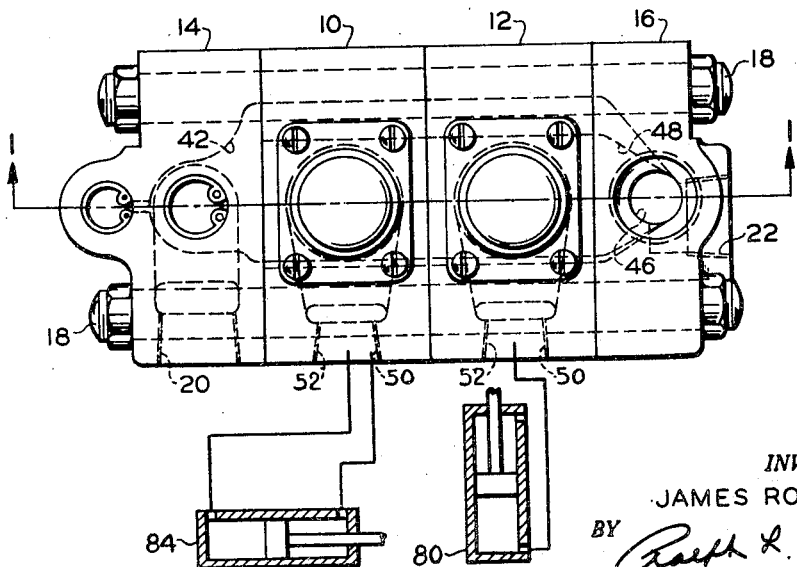
Figure 2 is a top view of the valve illustrated in Figure 1.

In its preferred embodiment illustrated, the invention comprises a multiple valve bank comprising a plurality of selector valve sections 10 and 12 together with an inlet plate 14 and an outlet plate 16. The latter are held together by a plurality of through bolts 18 in the usual manner. The bank has an inlet or supply connection 20 adapted to be connected by piping with the delivery line of a pump. At its opposite end, there is provided an outlet connection 22 adapted to be connected by the usual piping with the tank or return side of the usual hydraulic system. The supply connection 20 leads to a vertical bore 24 in which are mounted a ball check valve 26 and a pilot operated unloading valve 28. Springs 30 and 32 retained by plugs 34 and 36 normally hold the valves on their respective seats 38 and 40.

Figure 3:
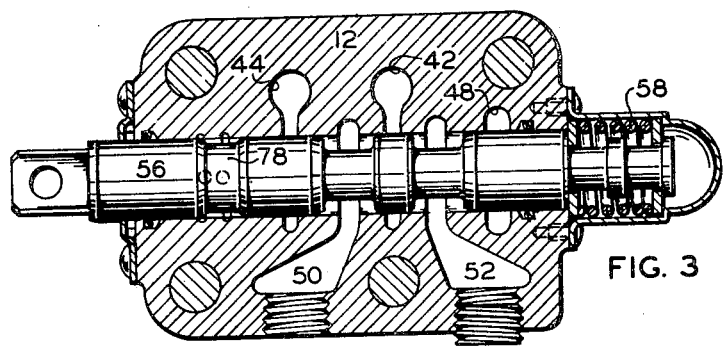
Figure 3 is a sectional view on line 3—3 of Figure 1.

Above the seat 38, bore 24 communicates with a transverse passage 42 extending through each of the valve sections 10 and 12 which is blocked at its right hand end by the end plate 16. This passage provides a pressure inlet to each of the valve sections in the bank and may be provided with a lateral enlargement as shown in Figure 3. Below the seat 40, the bore 24 communicates with another transverse passage 44 which extends through the valve sections 10 and 12 and into the outlet plate 16. This passage serves as one return connection for each of the valve sections as well as the unloading by-pass for the pump when the unloading valve is open. It also is provided with a lateral enlargement, as shown in Figure 3.

The outlet plate 16 is provided with a vertical bore 46 communicating with the outlet 22, with passage 44 and with a second transverse tank passage 48 which extends through the valve sections 10 and 12 but is blocked at its left-hand end by the inlet plate 14. Each of the valve sections 10 and 12 is also provided with one or more motor connection ports 50 and 52, the port 52 being plugged in the case of the single-acting valve section 12 shown in Figure 3. Slidable valve spools 54 and 56 control communication between passages 42 and 44 and ports 50, 50 and 52 after the manner of the usual four-way directional or selector valve, and are normally maintained in the neutral position illustrated, by centering spring assemblies 58 at their upper ends.

For the purpose of operating the unloading valve 28, it is arranged with a sliding fit in the lower part of bore 24 and forms therein a control chamber 60. The chamber 60 is in restricted communication with the supply connection 20 by means of the small passage 62 in valve 28 so that normally the same pressures exist above and below the valve. Thus the spring 32 together with the area differential between seat 40 and chamber 60 both serve to hold the valve on its seat. If, however, the chamber 60 should be vented through some path which permits fluid to escape faster than it can enter through restriction 62, then the balanced pressure conditions no longer exist and it is possible for the valve to open.

In the present embodiment, control chamber 60 is arranged to be vented in two alternative ways. For the purpose of limiting the maximum pressure in the supply of conduit 20, a pilot relief valve 64 is mounted in a bore 66 and urged on a seat 68 by a spring 70. The valve is connected, as shown, between chamber 60 and passage 44 by means of a branch connection 72. Also leading from the chamber 60 is a venting passage 74 which extends through each of the valves in the bank and terminates at its right end in the bore 46. The passage 74 is staggered on opposite sides of each spool 54 and 56 and the spools are provided with recesses 76 and 78 which normally connect the staggered portions of the passage 74 when the valve spool is in neutral position. In the case of the single acting valve spool 56, the recess 78 is somewhat longer so that it serves to connect the adjacent portions of passage 74 also when the valve is moved downwardly to connect cylinder port 50 with tank connection 44.

In operation, assuming that the supply and return connections 20 and 22 are connected to a suitable pump and tank and that the system is filled with oil, the condition of rest is illustrated in Figure 1. It will be seen that the pressure connection 42 is blocked at both four-way valves, and that the pump is by-passed through the unloading valve 28 and passage 44 to tank connection 22. This occurs by reason of the venting of control chamber 60 through the passage 74 which is open at both valve spools. When either valve spool is fully shifted out of neutral to a position to operate the corresponding fluid motor, the passage 74 is blocked and pressure then equalizes on opposite sides of the unloading valve 28 by means of the connection 62 so that the valve closes and pressure oil is available to be delivered through check valve 26 and passage 42 to the appropriate motor port where its use is required.

Figure 4:
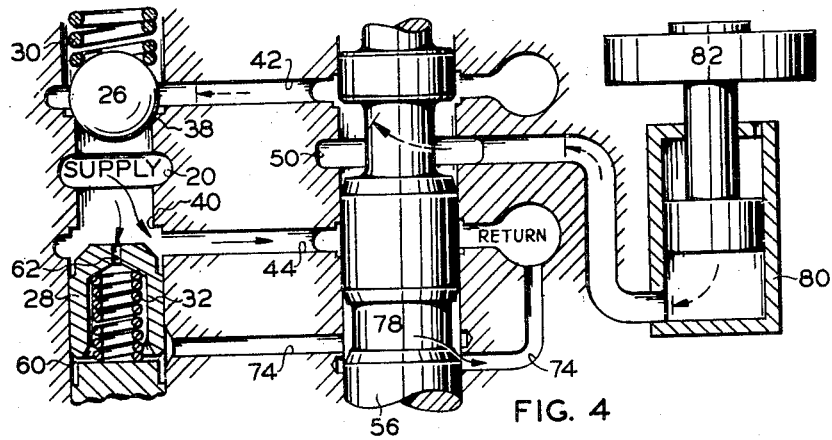
Figures 4 and 5 are circuit diagrams illustrating two different stages of operation of the system of Figure 1.
Figure 5:
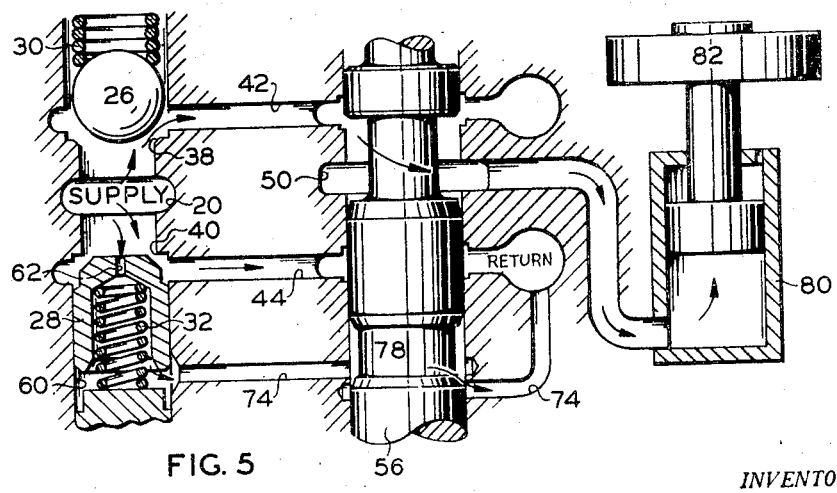

In order to illustrate more fully the action of the present valve in obtaining good metering characteristics with complete safety, reference may be had to Figures 4 and 5. In these figures, the action of starting a single-acting fluid motor connected to port 50 of valve 12 is diagrammatically illustrated in two stages. When valve spool 56 has been shifted upwardly a short distance, the first action that takes place is to open the pressure connection 42 to motor port 50. This occurs before any significant restriction occurs at the vent line 74. If the fluid motor, indicated diagrammatically at 80, is raised and has a gravity load indicated at 82, it will be seen that the pressure created by this load is exerted as indicated by the dotted arrows in Figure 4, but is not permitted to escape by reason of the check valve 26. Thus the load 82 cannot fall at this time. Likewise, because the passage 74 is restricted only slightly, pressure does not build up in chamber 60 and the unloading valve 28 remains open, as shown, and all of the pump oil is by-passed through valve 28 and passage 44. Further upward movement of the spool 56 will result in gradual restriction of passage 74 which can be manually controlled at will. By gradually further restricting the passage 74, the unloading valve 28 may be made to partially close and consequently build up pressure in the supply connection 20 to any value desired. As soon as that pressure has been built up to a value slightly in excess of the pressure created by the load 82, check valve 26 will open, as shown in Figure 5, causing a gradual acceleration of the load 82 by the motor 80. In this way, complete control of the operating pressure applied to the motor may be had and the unloading valve serves to temporarily divide the flow between the by-pass passage 44 and the pressure supply passage 42 in whatever proportions are necessary to maintain the desired pressure in the supply conduit 20.

The action of the single-acting valve to return the fluid motor is otherwise conventional and in the case of the double-acting valve 10, connections between the cylinder ports and the tank ports are established in the well known way. Thus, considering the left-hand valve in Figure 1, if the spool is raised, pressure oil flows from passage 42 to the port 50 and thence to the right-hand end of motor 84 in the same way as previously described in connection with motor 80. At the same time flow is established from the left-hand end of motor 84 through port 52 to the tank passage 48. If the spool is shifted to its downward position, flow is from passage 42 to port 52 and the left-hand end of motor 84, with the return flow taking place through port 50 and tank passage 44. It is preferable to proportion the spools and ports so that the tank connection begins to open up at about the time that the vent passage begins to be restricted. Thus further positive control of the action of a double-acting motor is assured.

It will be seen that the present invention provides a valve control system which contains a positive and gradual starting control without risking the possibility of dropping the load at any time and without ever building up pressure to the relief valve setting. These results are obtained by a simple, compact and reliable mechanism which may be produced at low cost.

While the form of embodiment of the invention as herein disclosed constitutes a preferred form, it is to be understood that other forms might be adopted, all coming within the scope of the claims which follow.

What is claimed is as follows:

1. A control valve system for a hydraulic power transmission having a pump and a hydraulic motor comprising a selector valve operable to selectively connect the pump with the motor, an unloading valve operable to by-pass the pump, pilot control means for the unloading valve operable by the selector valve when connection has been established from the pump to the motor, said pilot control means having a variable throttling action, and means at the unloading valve responsive to the throttling action at the pilot conrol means for producing a corresponding throttling action on the fluid by-passed through the unloading valve, whereby the pressure available from the pump may be variably adjusted at will by operation of the pilot control means.

2. A control valve system for a hydraulic power transmission having a pump and a hydraulic motor comprising a selector valve operable to selectively connect the pump with the motor, an unloading valve operable to by-pass the pump, pilot control means for the unloading valve operable by the selector valve when connection has been established from the pump to the motor, said pilot control means having a variable throttling action, and means including a high-rate biasing spring at the unloading valve responsive to the throttling action at the pliot control means for producing a corresponding throttling action on the fluid by-passed through the unloading valve, whereby the pressure available from the pump may be variably adjusted at will by operation of the pilot control means.

3. A control valve system for a hydraulic power transmission having a pump and a hydraulic motor comprising a selector valve operable to selectively connect the pump with the motor, an unloading valve operable to by-pass the pump, pilot control means for the unloading valve operable by the selector valve when connection has been established from the pump to the motor, said pilot control means having a variable throttling action, means at the unloading valve responsive to the throttling action at the pilot control means for producing a corresponding throttling action on the fluid by-passed through the unloading valve, whereby the pressure available from the pump may be variably adjusted at will by operation of the pilot control means, and a check valve in the supply connection to the selector valve for preventing return flow from the motor.

4. A control valve system for a hydraulic power transmission having a pump and a plurality of hydraulic motors comprising a selector valve operable to selectively connect the pump with the motor, a second selector valve operable to selectively connect the pump with another motor, an unloading valve operable to by-pass the pump, pilot control means for the unloading valve operable by each selector valve when connection has been established from the pump to the motor, said pilot control means having a variable throttling action, and means at the unloading valve responsive to the throttling action at the pilot control means for producing a corresponding throttling action on the fluid by-passed through the unloading valve, whereby the pressure available from the pump may be variably adjusted at will by operation of the pilot control means.

5. A control valve system for a hydraulic power transmission having a pump and a plurality of hydraulic motors comprising a selector valve operable to selectively connect the pump with the motor, a second selector valve operable to selectively connect the pump with another motor, an unloading valve operable to by-pass the pump, pilot control means for the unloading valve operable by each selector valve when connection has been established from the pump to the motor, said pilot control means comprising a plurality of valves connected in series each having a variable throttling action, and means at the unloading valve responsive to the throttling action at the pilot control means for producing a corresponding throttling action on the fluid by-passed through the unloading valve, whereby the pressure available from the pump may be variably adjusted at will by operation of the pilot control means.

6. A control valve system for a hydraulic power transmission having a pump and a hydraulic motor comprising a selector valve operable to selectively connect the pump with the motor, an unloading valve operable to by-pass the pump, pilot control means for the unloading valve operable by the selector valve when connection has been established from the pump to the motor, said pilot control means having a variable throttling action, means at the unloading valve responsive to the throttling action at the pilot control means for producing a corresponding throttling action on the fluid by-passed through the unloading valve, whereby the pressure available from the pump may be variably adjusted at will by operation of the pilot control means, and a pilot relief valve for additionally controlling the unloading valve to limit the maximum pressure in the system.

7. A control valve system for selectively regulating the supply of liquid from a constant delivery source to a fluid motor, said valve system comprising an unloading valve and a directional valve, the unloading valve comprising a shiftable valve member having opposed piston faces normally exposed to the delivery pressure of the source, pilot control means for the unloading valve arranged for operation with the directional valve to control the pressure applied to one piston face of the unloading valve to thereby unbalance and open the unloading valve when the directional valve is in neutral position and to balance and close the unloading valve when the directional valve is shifted to supply fluid to the motor, and means providing a variable bias on the unloading valve which varies with the position of the unloading valve, the pilot valve means being arranged for gradual operation only after the directional valve has been partially opened whereby the unloading valve may be regulated to vary the degree of closure thereof and thus regulate the volume supplied to the motor.

8. A control valve system for selectively regulating the supply of liquid from a constant delivery source to a fluid motor, said valve system comprising an unloading valve and a directional valve, the unloading valve comprising a shiftable valve member having opposed piston faces normally exposed to the delivery pressure of the source, and pilot control means for the unloading valve arranged for operation with the directional valve to control the pressure applied to one piston face of the unloading valve to thereby unbalance and open the unloading valve when the directional valve is in neutral position and to balance and close the unloading valve when the directional valve is shifted to supply fluid to the motor, the pilot valve means being arranged for gradual operation only after the directional valve has been partially opened whereby the unloading valve may be regulated to vary the degree of closure thereof and thus regulate the volume supplied to the motor.

9. A control valve system for selectively regulating the supply of liquid from a constant delivery source to a fluid motor, said valve system comprising an unloading valve and a directional valve, the unloading valve comprising a shiftable valve member having opposed piston faces normally exposed to the delivery pressure of the source, pilot control means for the unloading valve arranged for operation with the directional valve to control the pressure applied to one piston face of the unloading valve to thereby unbalance and open the unloading valve when the directional valve is in neutral position and to balance and close the unloading valve when the directional valve is shifted to supply fluid to the motor, the pilot valve means being arranged for gradual operation only after the directional valve has been partially opened whereby the unloading valve may be regulated to vary the degree of closure thereof and thus regulate the volume supplied to the motor, and a check valve in the supply connection to the directional valve to prevent return flow from the motor.

10. A control valve system for selectively regulating the supply of liquid from a constant delivery source to a fluid motor, said valve system comprising an unloading valve and a directional valve, the unloading valve comprising a shiftable valve member having opposed piston faces normally exposed to the delivery pressure of the source, pilot control means for the unloading valve arranged for operation with the directional valve to control the pressure applied to one piston face of the unloading valve to thereby unbalance and open the unloading valve when the directional valve is in neutral position and to balance and close the unloading valve when the directional valve is shifted to supply fluid to the motor, the pilot valve means being arranged for gradual operation only after the directional valve has been partially opened whereby the unloading valve may be regulated to vary the degree of closure thereof and thus regulate the volume supplied to the motor, and a pilot relief valve for additionally controlling the unloading valve to limit the maximum pressure in the system.

JAMES ROBINSON.

REFERENCES CITED

The following references are of record in the file of this patent:

UNITED STATES PATENTS

| Number | Name | Date |
|---|---|---|
| 2,392,421 | Stephens | Jan. 8, 1946 |